United States Patent
Im et al.

(10) Patent No.: US 11,680,124 B2
(45) Date of Patent: Jun. 20, 2023

(54) METHOD OF MANUFACTURING SELF-HEALING POLYMER THAT CAN CONTROL PHYSICAL CHARACTER ACCORDING TO COMPOSITION USING INITIATED CHEMICAL VAPOR DEPOSITION

(71) Applicant: Korea Advanced Institute of Science and Technology, Daejeon (KR)

(72) Inventors: SungGap Im, Daejeon (KR); Moon Jin Kwak, Daejeon (KR); Kihoon Jeong, Daejeon (KR); Youson Kim, Daejeon (KR); Yujin Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 339 days.

(21) Appl. No.: 17/022,307

(22) Filed: Sep. 16, 2020

(65) Prior Publication Data
US 2021/0079142 A1    Mar. 18, 2021

(30) Foreign Application Priority Data
Sep. 16, 2019    (KR) .................. 10-2019-0113232

(51) Int. Cl.
*C08F 220/32* (2006.01)
*C08F 220/28* (2006.01)
*C08K 5/14* (2006.01)
*B05D 1/00* (2006.01)

(52) U.S. Cl.
CPC ............ *C08F 220/281* (2020.02); *B05D 1/60* (2013.01); *C08F 220/325* (2020.02); *C08K 5/14* (2013.01); *B05D 2502/00* (2013.01)

(58) Field of Classification Search
CPC ...... C08F 220/325; C08F 220/20; C08F 2/34; C08K 5/14; C23C 16/452
See application file for complete search history.

(56) References Cited

U.S. PATENT DOCUMENTS

2014/0023799 A1*  1/2014  Takahashi ............. C08F 265/06
                                                      525/218
2018/0273796 A1*  9/2018  Smith ..................... C09D 7/63

FOREIGN PATENT DOCUMENTS

| CN | 105038566 B | * | 7/2017 |
| JP | 2015131925 A | * | 7/2015 |
| KR | 20180085218 A |  | 7/2018 |

OTHER PUBLICATIONS

Mao et al; Langmuir, vol. 20, pp. 2484-2488 (Year: 2004).*
A machine translation into English of CN-105038566-B; Chen et al (Year: 2017).*
A machine translation into English of JP-2015131925 A; Chen et al (Year: 2015).*

* cited by examiner

*Primary Examiner* — Karuna P Reddy
(74) *Attorney, Agent, or Firm* — Verrill Dana, LLP

(57) ABSTRACT

A method of manufacturing self-healing polymer capable of controlling physical properties is provided. The method includes forming the self-healing polymer by adjusting a copolymer composition using monomers of glycidyl methacrylate (GMA) and 2-hydroxyethyl acrylate (HEA) and an initiator of tert-butyl peroxide (TBPO) based on an initiated chemical vapor deposition method (iCVD).

4 Claims, 7 Drawing Sheets

METHOD OF MANUFACTURING SELF-HEALING POLYMER THAT CAN CONTROL PHYSICAL CHARACTER ACCORDING TO COMPOSITION USING INITIATED CHEMICAL VAPOR DEPOSITION

CROSS-REFERENCE TO RELATED APPLICATIONS

A claim for priority under 35 U.S.C. § 119 is made to Korean Patent Application No. 10-2019-0113232 filed on Sep. 16, 2019, in the Korean Intellectual Property Office, the entire contents of which are hereby incorporated by reference.

BACKGROUND

Embodiments of the inventive concept described herein relate to a method of manufacturing a self-healing polymer capable of controlling physical properties depending on a composition using a chemical vapor deposition method using an initiator, and more particularly, relate to a method of manufacturing a self-healing polymer by adjusting physical properties depending on a composition of a copolymer.

When using a conventional wearable, stretchable, or flexible device, it is easy to be exposed to various external forces such as bent, pulled, swept, or scratched, and this is inevitable. Therefore, long-term use of the device is possible only when the device returns to its original state after the external force is applied, but the device formed of existing materials is damaged not to return to its original state and is impossible to be used.

To this end, research has been conducted to apply a material having self-healing performance to the wearable, stretchable or flexible device, and efforts are made to solve the above-described problems.

Meanwhile, all conventional self-healing polymers are polymerized in a liquid phase, and a catalyst and various solvents are used while undergoing several processes for polymerization. In addition, the conventional self-healing polymers have a limitation in thinning because the conventional self-healing polymers are polymerized in the liquid phase and have high viscosity, and there is a limitation in that it is difficult to apply in a form of a thin film.

SUMMARY

Embodiments of the inventive concept provide a method of manufacturing a self-healing polymer including polymerizing monomers in a homogeneously mixed state in a gas phase using an initiated chemical vapor deposition method (iCVD) to form a copolymer and adjusting a composition of the copolymer to form the self-healing polymer, which is flat and transparent and shows fast self-healing time.

According to an exemplary embodiment, a method of manufacturing self-healing polymer capable of controlling physical properties includes forming the self-healing polymer by adjusting physical properties depending on a composition of a copolymer using monomers of glycidyl methacrylate (GMA) and 2-hydroxyethyl acrylate (HEA) and an initiator of tert-butyl peroxide (TBPO) based on an initiated chemical vapor deposition method (iCVD).

The forming of the self-healing polymer may adjust a flow rate of each of the monomers of glycidyl methacrylate (GMA) and 2-hydroxyethyl acrylate (HEA) to control the copolymer composition.

The copolymer of the composition having a high proportion of 2-hydroxyethyl acrylate (HEA) may show a fast self-healing time compared to the copolymer of the composition having a high proportion of glycidyl methacrylate (GMA).

The copolymer of the composition having a low proportion of glycidyl methacrylate (GMA) may have little change in mechanical properties before and after 30% strain and may restore the most properties in about 20 minutes at large strain of 150%.

The forming of the self-healing polymer may include depositing a gold electrode on the self-healing polymer to be applied to an electronic device.

The self-healing polymer may be flat and transparent regardless of the composition of the copolymer.

According to an exemplary embodiment, a self-healing polymer includes monomers including glycidyl methacrylate (GMA) and 2-hydroxyethyl acrylate (HEA) and an initiator including tert-butyl peroxide (TBPO), the self-healing polymer is formed by adjusting a copolymer composition using the monomers of glycidyl methacrylate (GMA) and 2-hydroxyethyl acrylate (HEA) and the initiator of tert-butyl peroxide (TBPO), based on an initiated chemical vapor deposition (iCVD) method.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
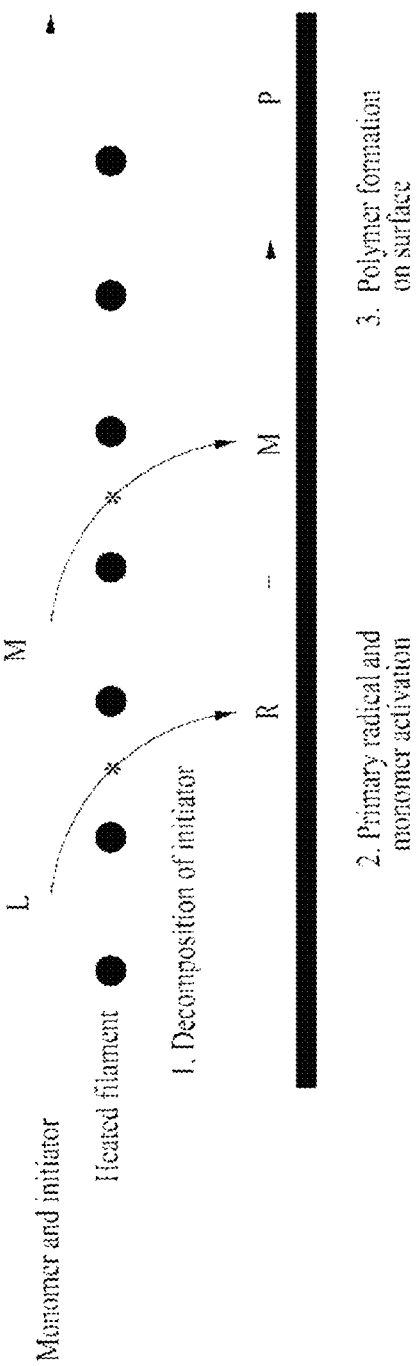
FIG. 1 is a view illustrating an initiated chemical vapor deposition (iCVD)

Hereinafter, embodiments according to the inventive concept will be described in detail with reference to the accompanying drawings. However, the inventive concept is not restricted or limited by the embodiments. In addition, the same reference numerals shown in each drawing denote the same member.

In addition, terms used herein are terms used to properly express preferred embodiments of the inventive concept, which may vary depending on the intention of viewers or operators, or customs in the field to which the inventive concept belongs. Accordingly, definitions of these terms should be made based on the contents throughout the present specification.

FIG. 1 is a view illustrating an initiated chemical vapor deposition (iCVD).

Referring to FIG. 1, in the initiated chemical vapor deposition (iCVD), "I" denotes an initiator, "M" denotes a monomer, "R" denotes a free radical, and "P" means that a polymerization of the monomer occurs by the free radical.

When the free radical is formed by pyrolysis of the initiator, the free radical activates the monomer adsorbed on a surface of the free radical to induce polymerization of the surrounding monomers, and this reaction continues to result in a polymer thin film.

A temperature used in the reaction to free radicalize the initiator is sufficient by heat applied from a filament of a gas phase reactor. Therefore, processes used in embodiments of the inventive concept may be sufficiently performed with low power. In addition, a reaction pressure of the gas phase reactor is in a range of 50 to 2000 mTorr, and this means that strict high vacuum conditions are not required, and thus the process may be performed with a single rotary pump instead of a high vacuum pump.

Physical properties of a self-healing polymer thin film obtained through the process may be easily controlled by adjusting process parameters of the initiated chemical vapor deposition method (iCVD). That is, process pressure, time, temperature, flow rate of each of the initiator and monomer, filament temperature, and substrate temperature are controlled by a person skilled in the art according to a purpose to adjust the physical properties such as molecular weight of the polymer thin film, desired thickness, composition, and deposition rate.

For example, the filament in the reactor of the inventive concept may be maintained at a high temperature of 120° C. to 200° C. to induce the gas phase reaction. Here, the temperature of the filament is high enough for TBPO pyrolysis but is a temperature at which most organic substances including other monomers are not pyrolyzed, thereby converting various types of monomers into the polymer film without chemical damage.

Figure 2:
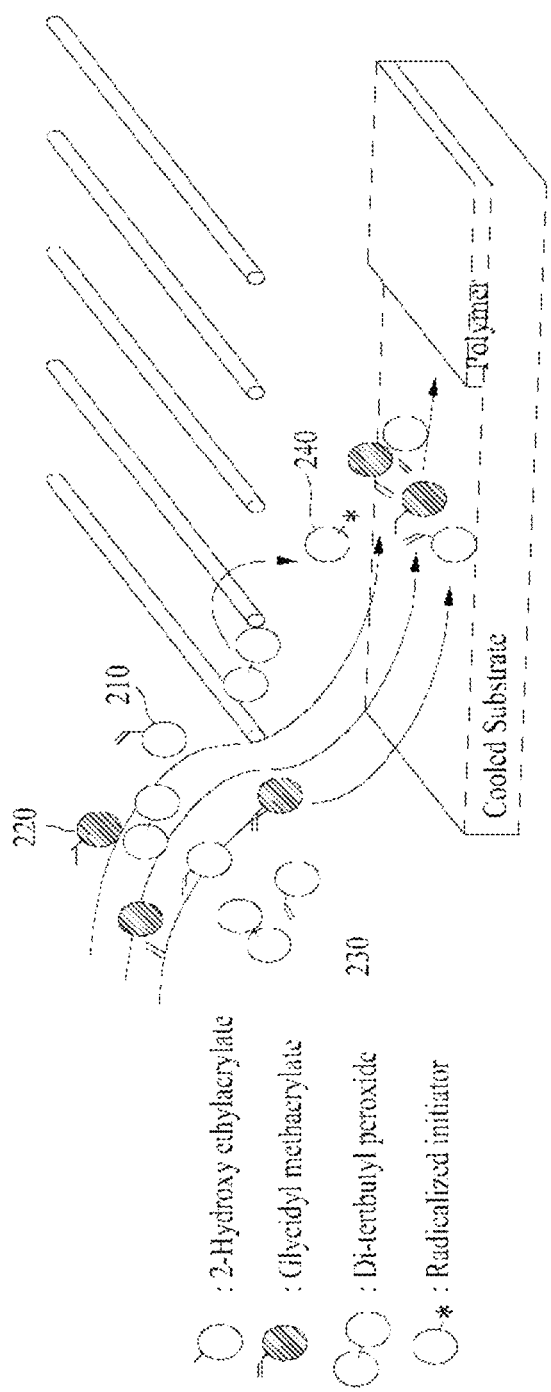
FIG. 2 shows an exemplary view illustrating a process of forming a self-healing polymer capable of controlling physical properties according to an embodiment of the inventive concept.

FIG. 2 shows an exemplary view illustrating a process of forming a self-healing polymer capable of controlling physical properties according to an embodiment of the inventive concept.

A method for forming a self-healing polymer capable of controlling physical properties according to an embodiment of the inventive concept is based on an initiated chemical vapor deposition (iCVD) method to form the self-healing polymer through adjusting physical properties depending on a composition of a copolymer using monomers of glycidyl methacrylate (GMA) and 2-hydroxyethyl acrylate (HEA), and an initiator of tert-butyl peroxide (TBPO).

The 'initiator' of the inventive concept is a substance that is decomposed by supply of heat in a reactor to form free radicals and is not particularly limited as long as it is a material capable of activating a monomer. Preferably, the initiator may be peroxide, for example, the radicalized initiator may be tert-butyl peroxide (TBPO) 230 and 240. TBPO 230 is a volatile material having a boiling point of about 110° C. and is a material performing pyrolysis around 150° C. Meanwhile, an amount of the initiator may be an amount required for a general polymerization reaction and may be an amount known in the art. For example, the initiator may be added in 0.5 to 5 mol %, but may be not limited to the above range, and may be greater or less than the above range.

The 'monomer' of the inventive concept is a material that has volatility in a chemical vapor deposition method and is capable of being activated by the initiator. The monomer may be vaporized under reduced pressure and elevated temperature, and may include, for example, glycidyl methacrylate (GMA) 220 and 2-hydroxyethyl acrylate (HEA) 210.

The method for forming the self-healing polymer capable of controlling the physical properties according to an embodiment of the inventive concept uses the iCVD method of polymerizing the polymer in the gas phase, and thus the monomers are polymerized in a uniformly mixed state in the gas phase and the self-healing polymer is formed by controlling the physical properties depending on the composition of the copolymer through flow control of each monomer.

In detail, the method for forming the self-healing polymer capable of controlling the physical properties according to an embodiment of the inventive concept may adjust the flow rate of each of the monomers of glycidyl methacrylate (GMA) 220 and 2-hydroxyethyl acrylate (HEA) 210 to control the composition of the copolymer. Here, the copolymer of the composition having a high proportion of 2-hydroxyethyl acrylate (HEA) 210 may show a quick self-healing time compared to the copolymer of the composition having a high proportion of glycidyl methacrylate (GMA) 220.

For example, the copolymer of the composition having the high proportion of 2-hydroxyethyl acrylate (HEA) 210 has little change in mechanical properties before and after 30% strain, and restores the most properties in about 20 minutes at large strain of 150%. However, in the copolymer of the composition having the low proportion of 2-hydroxyethyl acrylate (HEA) 210, that is, the high proportion of glycidyl methacrylate (GMA) 220, it may take about an hour to restore the physical properties at 60% strain.

The method of forming the self-healing polymer capable of controlling the physical properties according to an embodiment of the inventive concept may deposit a gold electrode on the formed self-healing polymer to be applied to an electronic device. For example, when the gold electrode is disposed on the self-healing polymer to form a circuit connecting an LED and a battery, which is artificially scratched, it may be seen through experiment that the LED light turns off, a gap opened narrows by the self-healing of the polymer in 20 seconds after the LED light turns off, and then the contact of the electrode is restored and the light turns on again. Accordingly, it may be seen that the self-healing polymer formed by the inventive concept is suitable for use in the electronic device.

Therefore, the method for forming the self-healing polymer capable of controlling the physical properties according to an embodiment of the inventive concept may form the self-healing polymer that is flat and transparent properties regardless of the composition of the copolymer. In addition, it may be seen through the experiment that the copolymer of the composition having the high proportion of 2-hydroxyethyl acrylate (HEA) 210 shows a rapid self-healing time of about 9 minutes in a scratch test with a razor blade.

Figure 3A:
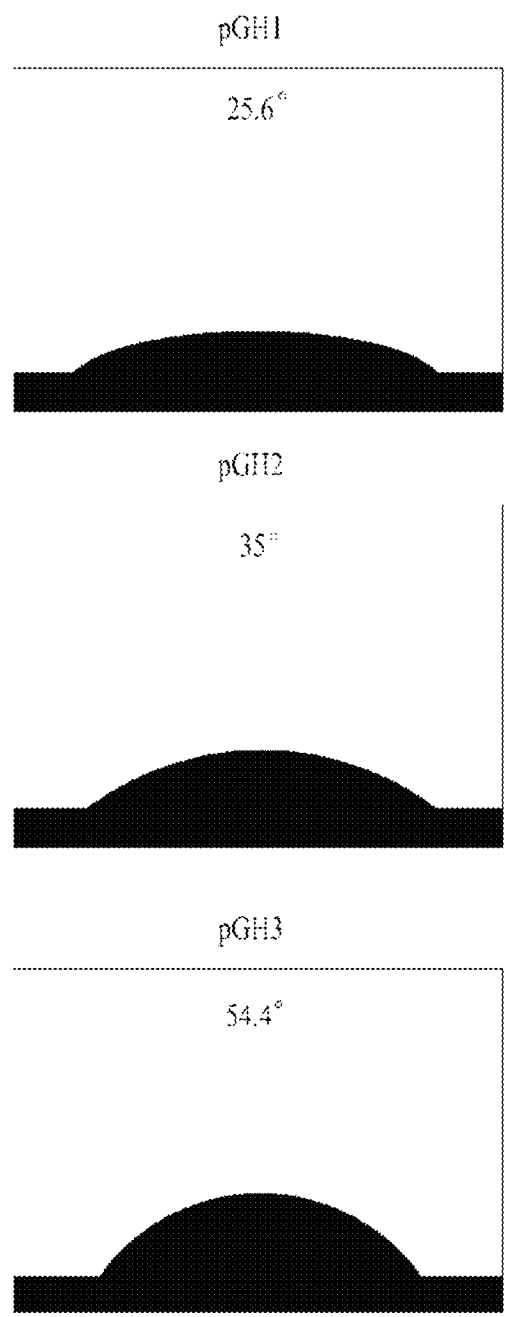
FIGS. 3A and 3B shows experimental results for a copolymer composition according to an embodiment of the inventive concept.
Figure 3B:
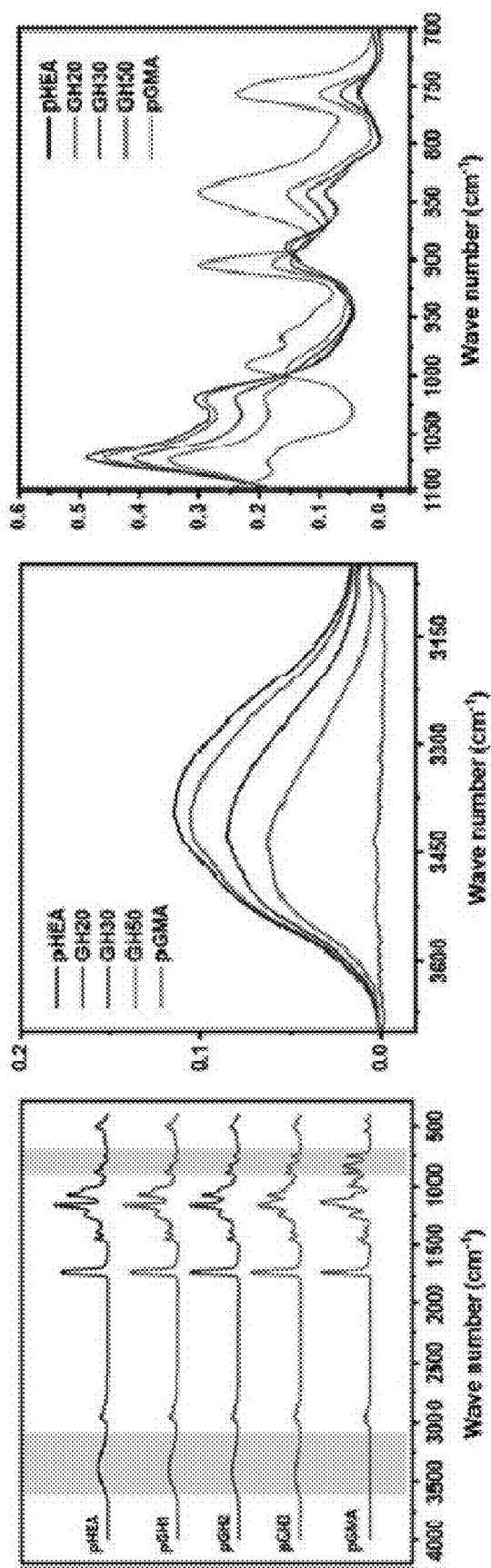

FIGS. 3A and 3B show experimental results for a copolymer composition according to an embodiment of the inventive concept.

In detail, FIG. 3A shows water contact angle data for copolymers of three compositions synthesized through controlling flow rates of monomers of glycidyl methacrylate (GMA) and 2-hydroxyethyl acrylate (HEA) using an initiated chemical vapor deposition (iCVD). FIG. 3B shows FT-IR data for the copolymers of the three compositions synthesized through controlling the flow rates of the monomers of glycidyl methacrylate (GMA) and 2-hydroxyethyl acrylate (HEA) using the initiated chemical vapor deposition (iCVD).

Referring to FIG. 3A, it may be seen that the composition of each copolymer is adjusted depending on the flow rate adjusted when the copolymer is synthesized using a vapor deposition process, and the water contact angle is increased as the GMA content is increased.

FIG. 3B is an experiment result of confirming the compositions of the copolymers synthesized depending on the flow rates of the monomers of glycidyl methacrylate (GMA) and 2-hydroxyethyl acrylate (HEA), through FT-IR. Referring to FIG. 3B, it may be seen that the compositions of the synthesized the copolymers are adjusted by the flow rates based on the flow rate control.

Through this, it may be seen that the compositions of the copolymers are controlled depending on the flow rate control of each of the monomers of glycidyl methacrylate (GMA) and 2-hydroxyethyl acrylate (HEA).

Figure 4:
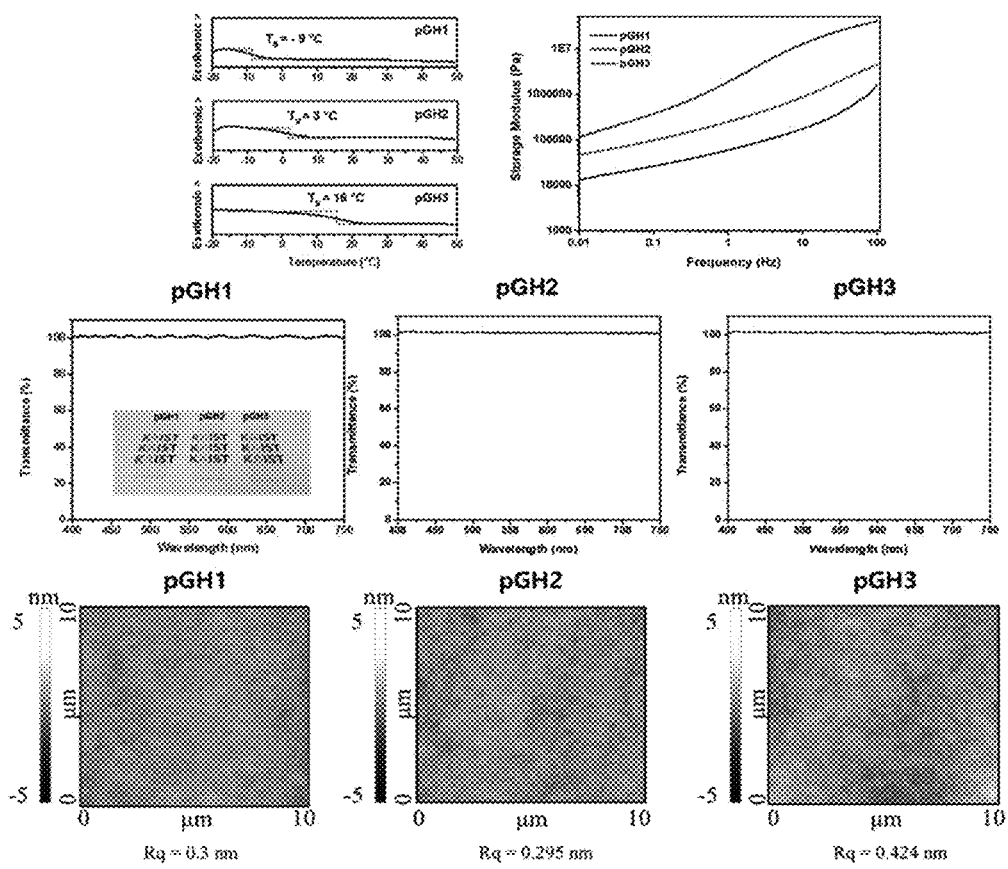
FIG. 4 shows results of a glass transition temperature, storage modulus, transmittance, and surface analysis for a copolymer composition according to an embodiment of the inventive concept.

FIG. 4 shows results of a glass transition temperature, storage modulus, transmittance, and surface analysis for a copolymer composition according to an embodiment of the inventive concept.

In detail, FIG. 4 is experiment results performing a thermal analysis using differential scanning calorimetry (DSC) depending on compositions of pGH copolymer combinations polymerized through the composition, an analysis of rheological properties using a rheometer, a transmittance measurement in a visible region using ultraviolet-visible ray spectroscopy (UV-Vis), and a surface analysis using atomic force microscope (AFM).

Referring to FIG. 4, it may be seen that the glass transition temperature decreases and the storage modulus decreases as a proportion of 2-hydroxyethyl acrylate (HEA) increases, and the copolymers of all three compositions pGH1, pGH2, and pGH3 are transparent in visible light although being deposited at 5 μm. Furthermore, referring to FIG. 4, it may be seen that copolymer layers of the same thickness are flatly deposited.

Figure 5:
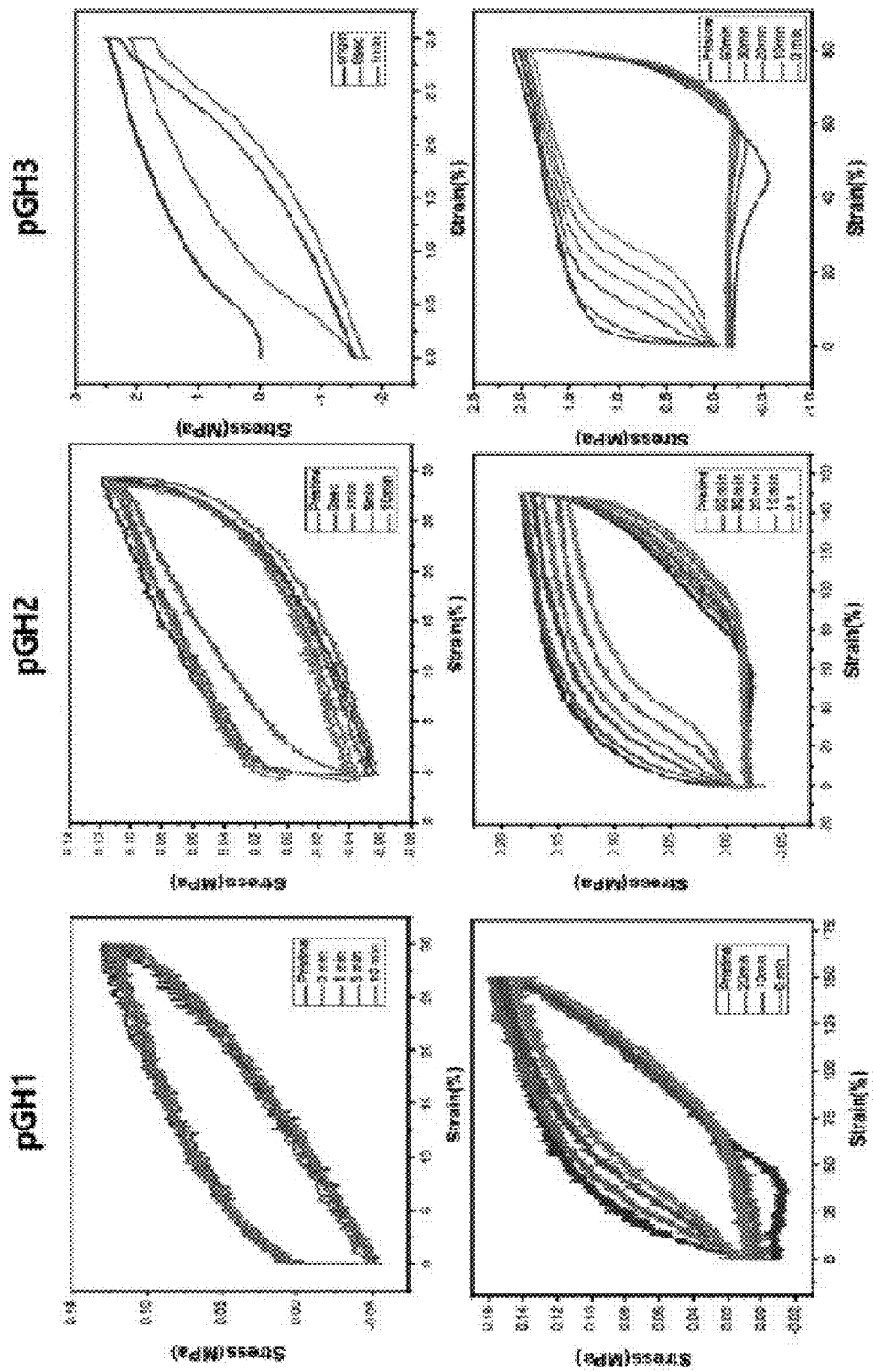
FIG. 5 is a loading-unloading experiment result measured using a universal testing machine according to an embodiment of the inventive concept.

FIG. 5 is a loading-unloading experiment result measured using a universal testing machine according to an embodiment of the inventive concept.

In detail, FIG. 5 shows the loading-unloading test data measured using the universal testing machine (UTM).

Referring to FIG. 5, it may be seen that strain is applied to the copolymers of the compositions of pGH1, pGH2 and pGH3, respectively, the physical properties are recovered after a certain time. Through this, it may be seen that each copolymer shows the rapid recovery of the physical properties in a small strain and large strain of 100% or more requires about 20 minutes to about an hour.

Here, pGH1 is a composition having a high proportion of 2-hydroxyethyl acrylate (HEA), pGH2 is a composition having a proportion of 2-hydroxyethyl acrylate (HEA) less than that of pGH1, and pGH3 is a composition having a proportion of 2-hydroxyethyl acrylate (HEA) less than that of pGH2.

Figure 6:
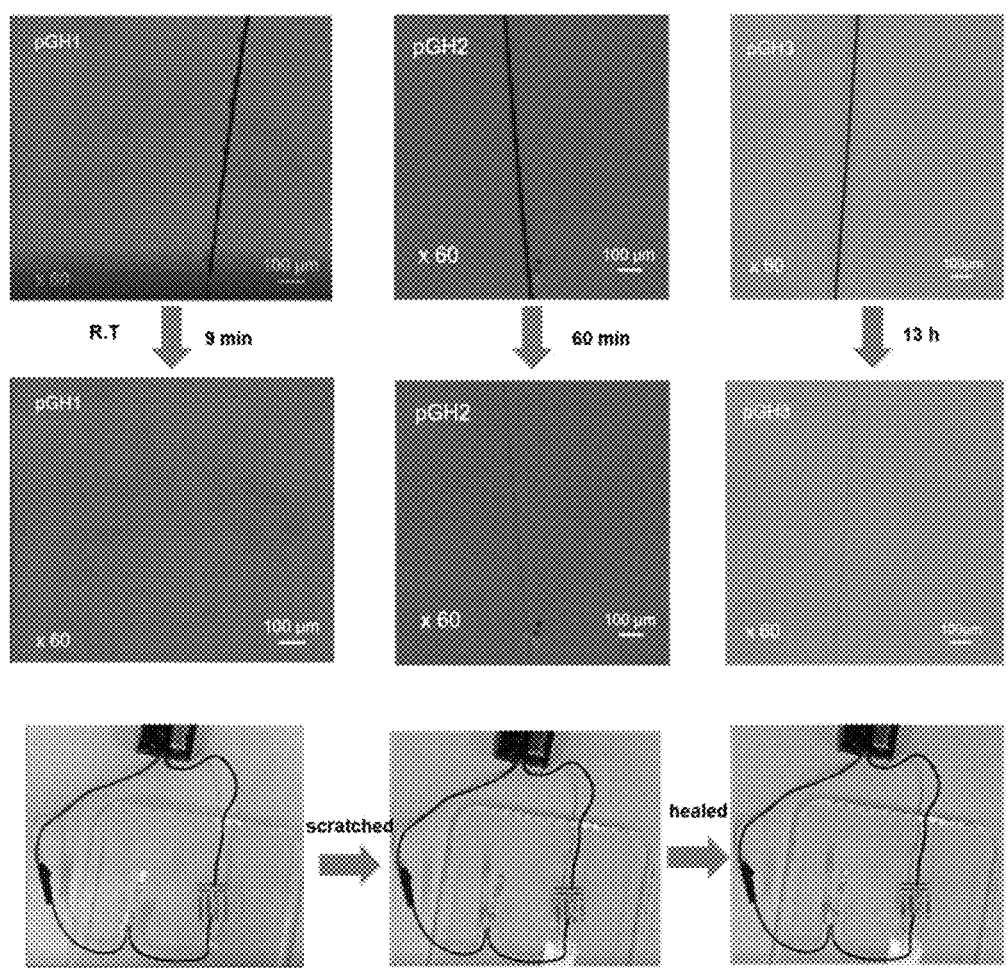
FIG. 6 shows an image of a scratched self-healing polymer and an experimental result for measuring a recovered self-healing time according to an embodiment of the inventive concept.

FIG. 6 shows an image of a scratched self-healing polymer and an experimental result for measuring a recovered self-healing time according to an embodiment of the inventive concept.

In detail, FIG. 6 shows experiment results of images (first row images) of self-healing polymers of each composition pGH1, pGH2, or pGH3 deposited by 5 μm on a slide glass, when scratching with a razor blade, images (second row images) after self-healing, and self-healing times taken depending on each composition pGH1, pGH2, or pGH3 (times indicated by arrows leading from the first row to the second row).

Referring to FIG. 6, it may be seen that the fastest self-healing is shown in pGH1 with the largest proportion of 2-hydroxyethyl acrylate (HEA), which is a fast rate compared to other self-healing polymers previously reported.

Furthermore, as in the images shown in the third row, when a gold electrode is deposited at 50 nm on the self-healing polymer deposited at 5 μm in pGH1 and is connected to a circuit connecting an LED and a battery and then the gold electrode is scratched with a razor (an image shown in a first column in the third row), the LED was immediately turned off as in an image shown in a second column in the third row, but after a certain period of time, the self-healing polymer is self-healed as shown an image shown in a third column, thereby connecting the electrode again and turning on the LED again in about 20 seconds.

That is, it may be seen that the very fast self-healing time is shown in the copolymer combination with the composition of the most 2-hydroxyethyl acrylate (HEA).

According to an embodiment of the inventive concept, the monomers in a homogeneously mixed state in a gas phase may be polymerized using the initiated chemical vapor deposition method (iCVD) to form the copolymer and the composition of the copolymer may be adjusted to form the self-healing polymer, which is flat and transparent and shows fast self-healing time.

In addition, according to an embodiment of the inventive concept, the monomers of glycidyl methacrylate (GMA) and 2-hydroxyethyl acrylate (HEA), and the initiator of tert-butyl peroxide (TBPO) may be used to be adjusted the composition of the copolymer through controlling the flow rate of each monomer.

While this disclosure includes specific example embodiments and drawings, it will be apparent to one of ordinary skill in the art that various alterations and modifications in form and details may be made in these example embodiments. For example, suitable results may be achieved if the described techniques are performed in a different order, and/or if components in a described system, architecture, device, or circuit are combined in a different manner, and/or replaced or supplemented by other components or equivalents thereof.

Accordingly, other implementations, other embodiments, and equivalents of claims are within the scope of the following claims.

What is claimed is:

1. A method of manufacturing self-healing polymer capable of controlling physical properties, the method comprising:
    forming the self-healing polymer by adjusting physical properties depending on a composition of a copolymer using monomers of glycidyl methacrylate (GMA) and 2-hydroxyethyl acrylate (HEA) and an initiator of tert-butyl peroxide (TBPO) based on an initiated chemical vapor deposition method (iCVD),
    wherein during the forming of the self-healing polymer a flow rate is adjusted of each of the monomers of glycidyl methacrylate (GMA) and 2-hydroxyethyl acrylate (HEA) to control the copolymer composition; and
    wherein the copolymer of the composition has a high proportion of 2-hydroxyethyl acrylate (HEA) and shows a fast self-healing time compared to the copolymer of the composition having a high proportion of glycidyl methacrylate (GMA).

2. The method of claim 1, wherein the copolymer of the composition having a low proportion of glycidyl methacrylate (GMA) has little change in mechanical properties before and after 30% strain and restores the most properties in about 20 minutes at large strain of 150%.

3. A method of manufacturing self-healing polymer capable of controlling physical properties, the method comprising:
   forming the self-healing polymer by adjusting physical properties depending on a composition of copolymer using monomers of glycidyl methacrylate (GMA) and 2-hydroxyethyl acrylate (HEA) and an initiator of tert-butyl peroxide (TBPO) based on an initiated chemical vapor deposition method (iCVD);
   wherein the forming of the self-healing polymer includes depositing a gold electrode on the self-healing polymer to be applied to an electronic device.

4. The method of claim 1, wherein the self-healing polymer is flat and transparent regardless of the composition of the copolymer.

\* \* \* \* \*